(12) United States Patent
Parejko et al.

(10) Patent No.: US 6,428,213 B1
(45) Date of Patent: Aug. 6, 2002

(54) VENTED BEARING END CAP

(75) Inventors: James A. Parejko, Plainfield; Jerry Morton, Cortland, both of IL (US)

(73) Assignee: Emerson Power Transmission, Maysville, KY (US)

( * ) Notice: Subject to any disclaimer, the term of this patent is extended or adjusted under 35 U.S.C. 154(b) by 62 days.

(21) Appl. No.: 09/721,165

(22) Filed: Nov. 22, 2000

(51) Int. Cl.[7] ............................................... F16C 33/76
(52) U.S. Cl. ..................... 384/489; 29/898.11
(58) Field of Search ................. 384/489, 477; 277/928, 635; 29/898.11

(56) References Cited

U.S. PATENT DOCUMENTS

| | | | | |
|---|---|---|---|---|
| 4,368,933 A | * | 1/1983 | Motsch | 384/130 |
| 5,328,276 A | * | 7/1994 | Linteau | 384/477 |
| 5,678,934 A | * | 10/1997 | Fischer et al. | 384/489 |
| 5,711,617 A | * | 1/1998 | Scheller | 384/484 |
| 5,711,618 A | * | 1/1998 | Waskiewicz | 384/489 |
| 5,857,781 A | * | 1/1999 | Ward et al. | 384/489 |

* cited by examiner

*Primary Examiner*—Thomas R. Hannon
(74) *Attorney, Agent, or Firm*—McDonnell Boehnen Holbert & Berghoff

(57) ABSTRACT

A bearing end cap having a circular mounting surface, a sidewall adjacent to the mounting surface, a vent positioned on the sidewall, and a shroud extending outwardly from the side wall and at least partially encircling the vent.

26 Claims, 2 Drawing Sheets

VENTED BEARING END CAP

BACKGROUND OF INVENTION

1. Field of Invention

This invention is directed generally to bearing assemblies, and more particularly to a vented bearing end cap adapted for attachment to a bearing assembly mounted to a rotating shaft.

2. Background of the Invention

For years, bearing assemblies have been used on rotating shafts. For example, in automated conveyor lines, bearing assemblies are mounted to rotating shafts. In many applications, the bearing assemblies are subjected to harsh operating conditions involving liquid, gaseous, and solid contaminants. The field of beverage bottling presents one particularly harsh environment. Bearings are subjected to spilled juices such as orange and grape juice, and acidic lemonade. Sports drinks, beer, ginger ale, and cola also represent harmful contaminants that may come in contact with the bearing and reduce bearing life. Other packaging and handling environments also subject bearing assemblies to potentially caustic materials. In these applications, it is very important for the lines to continue running, without unscheduled downtime. A bearing failure can result in shutting an entire line down while repairs or replacement bearings are provided. Such costly downtime is to be avoided at all costs.

Consequently, efforts have been made to provide corrosion resistant bearings and bearing assemblies that include various, and oftentimes, intricate sealing arrangements. One such line of bearings is the SEALMASTER® Gold Line Corrosion Resistant Bearings that are specially designed and manufactured for abrasive and wet environments. In addition, bearing end caps have been provided at the end of a rotating shaft to provide an additional line of defense against harmful contaminants and potentially corrosive materials. One such bearing end cap has been provided in the form of a stainless steel end cap that is typically bolted to the bearing housing. As an alternative to a bolted mounting, the end cap can be provided with exterior retention snaps that snap fit into a corresponding groove in the housing to mount the end cap to the bearing housing. The end cap may be either closed, where the end of the rotating shaft is positioned inside the end cap, or it may be open, where the rotating shaft is allowed to pass the through the end cap. The use of bearing end caps in such situations has provided an added measure of protection to keep contaminants out of the bearing. However, the use of such an end cap presents additional difficulties. For example, in many operating environments, it is common to periodically wash down the equipment with hot water or cleaning solutions under high pressure. Typical wash down protocols use a 1500 p.s.i. rinse at 170 to 180 degrees using hot water or low PH rinse or bleach. The rinse has a tendency to penetrate any seal between the end cap and the bearing housing to which it is mounted. Thus, the end cap may actually trap water, and its accompanying contaminants, between the end cap and the bearing itself. This is not an ideal situation because the contaminants may work their way into the seal creating reduced bearing effectiveness and bearing life. Moreover, the rotating shafts and bearings often operate under heated working conditions. Upon cool down, condensation may occur causing a pooling of water within the end cap.

Accordingly, it has been found that a hole or vent in the underside of the end cap can be used to provide an exit path for any water that enters the end cap during washdown or that forms from condensation during a cool down period. In addition, such a vent serves as a pressure relief for any pressure buildup that occurs during the high pressure washdowns. However, the use of a vent presents additional considerations as well. For example, the use of a vent may allow the rinse to enter the end cap through the vent during washdown, and thus allow undesirable contaminants to come in closer proximity to the bearing. Consequently, there is a need to provide an end cap having a vent that can provide an exit pathway for any trapped water within the end cap, yet also prevent water from entering the endcap during washdown.

3. SUMMARY OF THE INVENTION

The present invention is specifically directed to a bearing end cap adapted for mounting to a bearing housing. In the disclosed embodiment, the end cap is provided with a shroud that extends outwardly from the exterior surface of the sidewall of the end cap and generally encircles a hole or drain that vents the inside of the end cap. The shroud serves to shield the vent and prevent water from entering the end cap during washdown measures. Collectively, the shroud and vent are termed a directional vent.

In a preferred embodiment, the end cap is injection molded and the shroud is integrally molded with the end cap. In addition, although the vent or drain can then be quickly drilled or punched through in a simple secondary operation after the injection molding process is complete, ideally the vent is directly molded into the end cap during the initial injection molding process using a side action, wherein a movable pin within the mold actually forms the vent. Thus, the end cap can be made in a single injection molding process. The geometry of the shroud can consist of any geometry suitable to shield the vent. However, preferably the shroud is generally semicircular, having a break therein facing the open end of the end cap that abuts the bearing housing when mounted. Thus, the vent is positioned between the housing and the generally semicircular shroud when the end cap is mounted to the housing. This positioning of the shroud serves to block and deflect rinse water that is sprayed towards the end cap and housing during wash down. In addition, with the end cap mounted to a circular groove of the housing using retention snaps, the end cap can be rotated about the circular groove. Typically, the end cap is mounted such that the vent is positioned at the lowest point of the end cap relative to the housing. This allows the vent to drain any water or condensation accumulated within the end cap. However, during washdown, the end cap can be rotated 180 degrees to position the vent at the highest point of the end cap relative to the housing. This allows the vent to be further insulated from the wash down rinse, wherein the end cap itself serves to block the incoming rinse. Alternatively, the end cap can be rotated to any position to position the vent away from the direction of the rinse.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
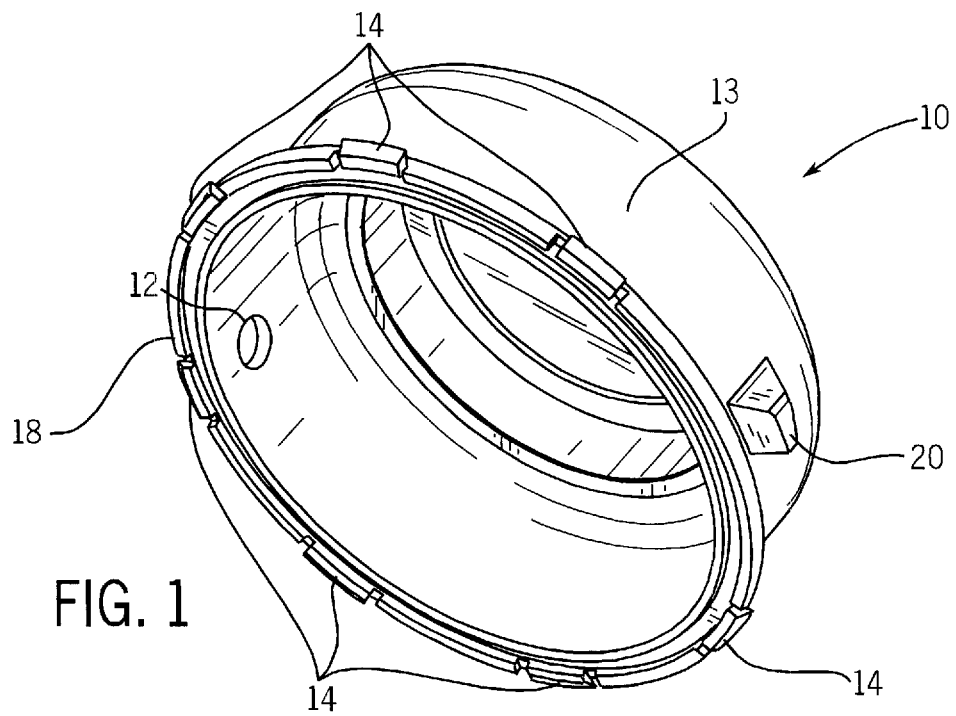
FIG. 1 is a perspective view showing the inside of the bearing end cap of the present invention.

While the invention is susceptible to various modifications and alternative forms, specific embodiments thereof are shown by way of example in the drawings and will herein be described in detail. It should be specifically understood with respect to the drawings, that the drawings are of a preferred embodiment, and there are many other embodiments and forms in which the present invention may appear. It should also be understood that the drawings and detailed description thereof are not intended to limit the invention to the particular form disclosed, but on the contrary, the invention is to cover all modifications, equivalents and alternatives falling within the spirit and scope of the present invention or within the scope of the appended claims.

In addition, while the present invention is particularly useful in applications for use in conveyors in the bottling and beverage industry where harsh operating conditions may be present, the end cap of the present invention may be used for any other application where the use of an end cap would be suitable.

DETAILED DESCRIPTION OF THE PREFERRED EMBODIMENT

A bearing end cap 10 made in accordance with the principles of the present invention is depicted in FIGS. 1–5. As shown in FIG. 1, end cap 10 includes a vent 12 located in a sidewall 13 of the end cap. Bearing end cap 10 includes a circular mounting surface 18 that is adapted to be mounted into a corresponding circular groove of a bearing housing. Mounting surface 18 includes a plurality of spaced apart retention snaps 14 that interact with a circular groove of the bearing housing to secure the end cap to the bearing housing. End cap 10 also includes a removal nub 20 located on sidewall 13 that provides a means for removing the end cap from the bearing housing. A screwdriver can be placed between the removal nub 20 and the bearing housing, and a force exerted against the nub in a direction away from the bearing housing will release the retention snaps from the circular groove of the bearing housing to effect the removal of the end cap. End cap 10 may have a diameter of approximately 2.75 inches, and may have a width of slightly more than an inch. However, end caps of varying sizes can be used depending on the bearing housing, size of the shaft, and geometry of the retention groove of the housing. End caps ranging in size from 1.75 to 5 inches in diameter are commonly available. Certain dimensional data discussed below pertains to the 2.75 inch diameter end cap, and those dimensions would vary depending on the diameter and size of the end cap used. Accordingly, the present invention can be applied and used on a wide variety end caps of varying shapes and sizes.

Figure 2:
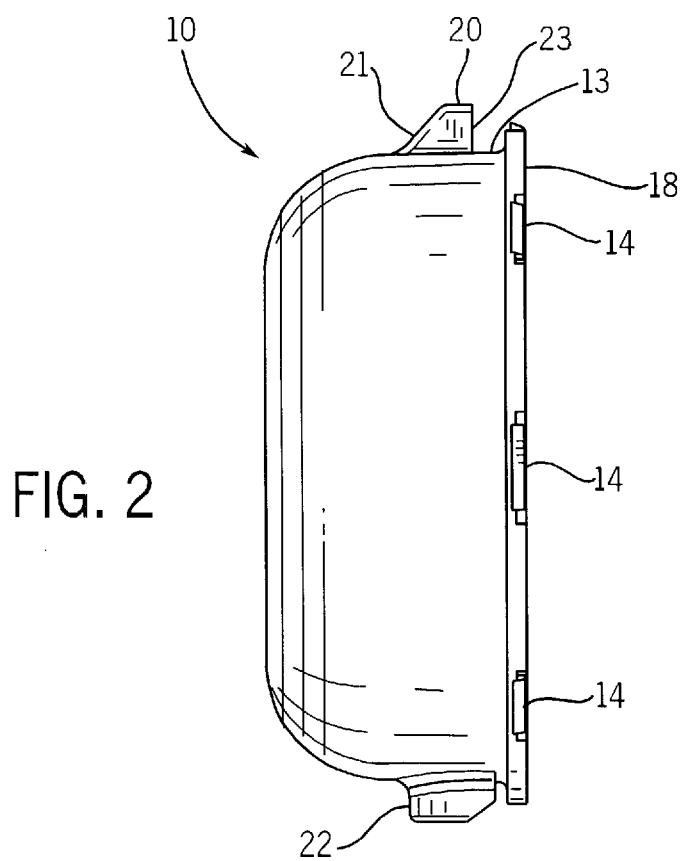
FIG. 2 is a side view of the bearing end cap of the present invention showing the shroud on the bottom of the end cap.

FIG. 2 depicts a side view of bearing end cap 10 with removal nub 20 located on sidewall 13 at the top end of the bearing end cap. Retention snaps 14 are shown on circular mounting surface 18. Retention snaps 14 are preferably positioned at 45 degree intervals around the mounting surface 18 to provide for a uniform retention force. However, different spacings, non-uniform spacings, and a greater or lesser number of retention snaps may be used without departing from the spirit of the invention. A shroud 22 is shown at the bottom end of the bearing end cap. Shroud 22 extends outwardly from the sidewall 13. The removal nub 20 is shown having a flat surface 23 facing towards the open end of the end cap. Opposite flat surface 23 is an upwardly sloping surface 21 that extends to an outer surface of the removal nub 20. Thus, the base of the removal nub is wider than the outer surface. This provides greater strength for the removal nub to withstand the force exerted by a screwdriver or other implement during the removal of the end cap from the bearing housing. The flat surface 23 provides a sufficient surface for a screwdriver or other implement to engage the removal nub 20 during the removal process. In a preferred embodiment, the removal nub extends from sidewall 13 approximately a quarter of an inch, and most preferably 0.221 inches. Similarly, the upwardly sloping surface 21 is sloped at an angle of approximately 45 degrees, and most preferably an angle of 43 degrees. The base of the removal nub 20 is approximately 0.3 inches in width. The width of the base and the upwardly sloping surface 21 provides for sufficient strength of the removal nub and facilitates removal from the injection mold.

Figure 3:
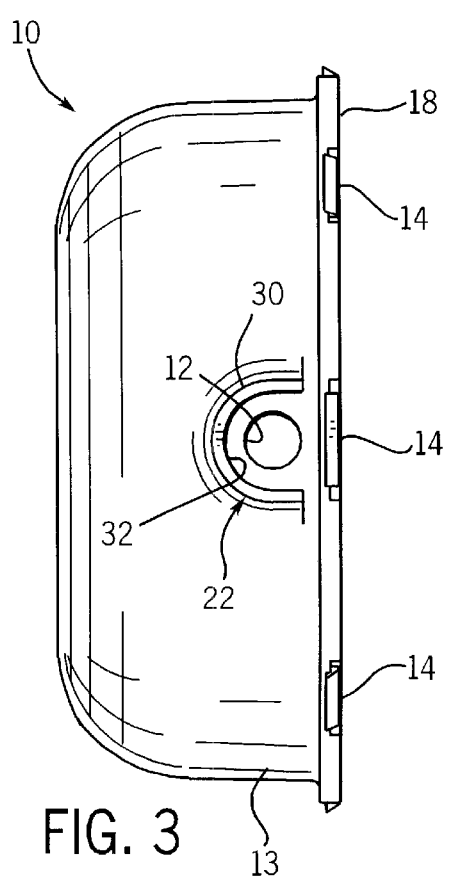
FIG. 3 is another side view of the bearing end cap of the present invention showing the shroud and vent in the center of the end cap.

FIG. 3 depicts another side view of the bearing end cap 10 with shroud 22 located on sidewall 13 at the middle of the end cap 10. Shroud 22 is shown in a generally semicircular geometry surrounding vent 12. The shroud 22 can be provided with any suitable geometry. Preferably, however, the shroud is generally semicircular. The semicircular geometry facilitates the deflection of the rinse during washdown procedures. As shown, the shroud 22 has a break, or opening therein facing the open end of the end cap 10. The shroud serves to prevent water from the rinse from entering the vent 12. When mounted, the shroud of the end cap is positioned between the vent and the source of the rinse water and deflects water away from the bearing housing and away from the vent 12. Vent 12 is shown as a circular hole that is directly molded, drilled or punched into the end cap. However, the vent could be square, octagonal, or any other geometry suitable for venting the inside of the end cap. In a preferred embodiment, the vent is a circular opening approximately a quarter inch in diameter, and most preferably 0.25 inches in diameter. In a preferred embodiment, the vent 12 is molded into the end cap during the injection molding process using a side action, wherein a movable pin within the mold forms vent 12. However, the area of the vent opening can be larger or smaller depending on the application, provided that the vent is sufficiently sized to allow for the drainage of any water that may enter the cap. The size of the vent opening should also be sized to account for any anticipated grease buildup that could block the vent opening. The centerline of the vent 12 is preferably spaced on the sidewall at a distance sufficient to accommodate the varying geometries of the bearing housings typically used. The shroud includes an exterior surface 30 and an interior surface 32. In a preferred embodiment, the interior surface 32 has a diameter of approximately a half inch, and is most preferably between 0.4 and 0.425 inches. Similarly, the break, or opening, in the shroud 22 also has a width of approximately a half inch and is most preferably between 0.4 and 0.425 inches.

Figure 4:
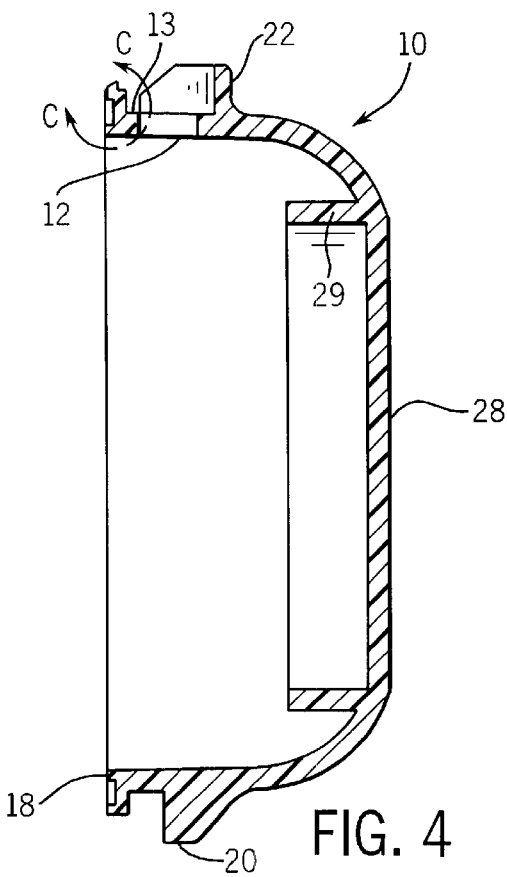
FIG. 4 is a cutaway side view of the bearing end cap of the present invention showing the directional vent at the top of the end cap.

FIG. 4 depicts a cutaway side view of the bearing end cap 10 of the present invention. As shown in FIG. 4, shroud 22 extends outwardly from side wall 13. Preferably, the shroud extends a distance sufficient to deflect and block water from entering the vent 12. In a preferred embodiment, the shroud 22 extends outwardly from side wall 13 a distance of about 0.5 inches, and most preferably 0.458 inches. The outward extension of the shroud is thus limited somewhat to account for varying geometries of the bearing housings typically used. The end cap shown in FIG. 4 also includes a circular extension 29 extending towards the open end of the end cap from an internal side of closed end 28. This extension allows for the reception of a shaft ending within the end cap. The circular extension 29 serves to allow for an oil seal to be positioned between the circular extension and the shaft in applications where the shaft extends through the end cap. The circular extension 29 may extend from the internal side of closed end 28 for a third of an inch. However, it may extend a greater or lesser distance depending on the application or construction of the end cap.

End cap 10 may also be provided where closed end 28 is removed from the end cap to allow for a shaft to extend through the end cap. The end cap may be provided with notches on the interior surface of closed end 28 to facilitate removal of the closed end 28.

Figure 5:
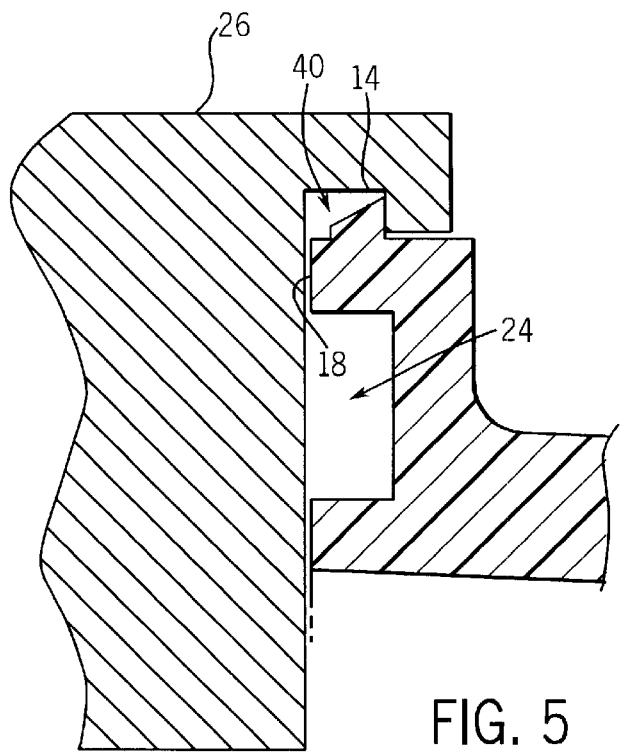
FIG. 5 is a cutaway view of the mounting surface of the bearing end cap mounted in the bearing housing.

FIG. 5 shows detail C from FIG. 4 in greater detail. As shown in FIG. 5, mounting surface 18 abuts the bearing housing 26. Mounting surface 18 also includes a circular seal groove 24 for positioning a seal therein (not shown). The seal may be an O-Ring seal, or any other effective sealing means. Preferably, the seal is resilient and compressible to allow a retention force to be exerted against the end cap and through the retention snaps 14 against a mating surface of the circular groove 40 in bearing housing 26. However, any number of different sealing parts may be used without departing from the spirit of the invention. As shown in FIG. 5, the retention snaps 14 have a flat surface that abuts a mating surface of the circular groove 40 and an oppositely disposed tapered side. The tapered side facilitates the mounting of the end cap and eases the retention snaps 14 into the circular groove 40. In a preferred embodiment, the retention snaps outwardly extend 0.024 of an inch. However, the snaps could extend a greater or lesser distance depending on the size of the circular groove, and the number and spacing of the retention snaps used. The retention snaps should provide enough of a retention force to insure that the end cap stays securely mounted during high pressure washdown procedures, yet still allow for removal of end cap using the removal nub.

The end cap of the present invention is preferably an integral injection molded unit. However, the directional vent disclosed herein could be used on an end cap consisting of any construction. Providing an end cap that is injection molded with an integral removal nub and shroud provides a significant manufacturing advantage. The end cap can be made in a single operation allowing for significant cost savings. Also, the injection molded end cap is less costly than the stainless steel caps used in existing designs. In addition, a molded end cap is somewhat flexible allowing the end cap to adjust for any out of roundness that may be found in the corresponding circular groove in the bearing housing. In a preferred embodiment, the end cap is molded using polypropylene. This provides for sufficient flexibility and strength in the bearing end cap.

While certain features and embodiments of the invention have been described herein, it will be readily understood that the invention encompasses all modifications and enhancements within the scope and spirit of the present invention.

What is claimed is:

1. A bearing end cap comprising:
   a circular mounting surface;
   a sidewall adjacent the mounting surface;
   a vent positioned in the sidewall; and
   a shroud extending outwardly from said sidewall and at least partially encircling said vent.
2. The end cap of claim 1, wherein the shroud is semi-circular.
3. The end cap of claim 2, wherein the shroud includes an opening facing towards an open end of the end cap.
4. The end cap of claim 3, wherein the opening of the shroud has a width of between 0.4 and 0.425 inches.
5. The end cap of claim 2, wherein the shroud has an interior diameter of between 0.4 and 0.425 inches.
6. The end cap of claim 1, wherein the shroud extends from the sidewall approximately 0.5 inches.
7. The end cap of claim 1, wherein the vent is a circular hole.
8. The end cap of claim 7, wherein the circular hole has a diameter of 0.25 inches.
9. The end cap of claim 1, wherein the end cap is injection molded.
10. The end cap of claim 9, wherein the shroud is integrally molded to the end cap.
11. The end cap of claim 1, wherein the mounting surface is adapted for a snap fit into a circular groove of a bearing housing.
12. The end cap of claim 1, wherein the mounting surface includes a plurality of retention snaps extending radially outwardly.
13. The end cap of claim 12, wherein the plurality of retention snaps are uniformly spaced apart.
14. The end cap of claim 13, wherein the plurality of retention snaps are spaced apart at an angle of 45 degrees.
15. The end cap of claim 12, wherein the retention snaps outwardly extend 0.025 inches from an exterior of the mounting surface.
16. The end cap of claim 12, wherein the retention snaps have a flat surface and an oppositely disposed tapered side.
17. The end cap of claim 1, further including a removal nub outwardly extending from the sidewall.
18. The end cap of claim 17, wherein the removal nub has a flat surface facing an open end of the end cap.
19. The end cap of claim 18, wherein the removal has a sloped side oppositely disposed of the flat surface.
20. The end cap of claim 17, wherein the removal nub is disposed on the sidewall 180 degrees from the vent.
21. The end cap of claim 1, wherein the mounting surface includes a seal groove.
22. The end cap of claim 1, wherein the end cap has a closed end.
23. The end cap of claim 22, wherein an internal surface of the closed end includes a circular extension extending towards an open end of the end cap.
24. The end cap of claim 22, wherein an internal surface of the closed end includes notches to facilitate removal of the closed end.
25. A method of forming a bearing end cap, comprising the steps of:
   injection molding a bearing end cap having a circular mounting surface;
   a sidewall adjacent the mounting surface;
   a vent positioned in the sidewall; and
   a shroud extending outwardly from said sidewall and at least partially encircling said vent.
26. The method of claim 25 wherein a movable pin forms the vent in a side action molding operation.

* * * * *